(12) United States Patent
Williams et al.

(10) Patent No.: US 8,819,632 B2
(45) Date of Patent: Aug. 26, 2014

(54) TECHNIQUES FOR DISTRIBUTING INFORMATION IN A COMPUTER NETWORK RELATED TO A SOFTWARE ANOMALY

(75) Inventors: Alexis Williams, Odessa, FL (US); Analia Mastrogiovanni, Tampa, FL (US); James Hatton, Odessa, FL (US)

(73) Assignee: salesforce.com, inc., San Francisco, CA (US)

( * ) Notice: Subject to any disclaimer, the term of this patent is extended or adjusted under 35 U.S.C. 154(b) by 480 days.

(21) Appl. No.: 13/028,236

(22) Filed: Feb. 16, 2011

(65) Prior Publication Data

US 2012/0011406 A1    Jan. 12, 2012

Related U.S. Application Data

(60) Provisional application No. 61/363,176, filed on Jul. 9, 2010.

(51) Int. Cl.
*G06F 9/44* (2006.01)

(52) U.S. Cl.
USPC ........... 717/124; 717/120; 717/121; 717/122; 717/123; 714/38.14

(58) Field of Classification Search
None
See application file for complete search history.

(56) References Cited

U.S. PATENT DOCUMENTS

| | | | |
|---|---|---|---|
| 5,072,370 A | 12/1991 | Durdik | |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,787,437 A | 7/1998 | Potterveld et al. | |
| 5,794,232 A | 8/1998 | Mahlum et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,941,947 A | 8/1999 | Brown et al. | |
| 5,950,190 A | 9/1999 | Yeager et al. | |
| 5,963,953 A | 10/1999 | Cram et al. | |
| 5,974,409 A | 10/1999 | Sanu et al. | |

(Continued)

OTHER PUBLICATIONS

[online]; [published on Oct. 17, 2008]; [retrieved on Feb. 26, 2010]; retrieved from http://en.wikipedia.org/wiki/Push_technology.

(Continued)

*Primary Examiner* — Don Wong
*Assistant Examiner* — Roberto E Luna
(74) *Attorney, Agent, or Firm* — Ingrassia Fisher & Lorenz, P.C.

(57) ABSTRACT

The present invention is directed to methods and systems of distributing information in a computer network related to a report a software anomaly that includes receiving information concerning the reported software anomaly (RSA); identifying a problematic functional characteristic included in the RSA; ascertaining from a plurality of computer-readable addresses a sub-group of the computer-readable addresses that correspond to parties with information corresponding to the problematic functional characteristic; storing on the computer network an investigation record having associated therewith data corresponding to the RSA; and transmitting to the sub-group a message perceivable by the parties indicating a location on the computer network of the investigation record.

24 Claims, 8 Drawing Sheets

(56) References Cited

U.S. PATENT DOCUMENTS

| | | |
|---|---|---|
| 5,987,471 A | 11/1999 | Bodine et al. |
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Statukis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,434,208 B2 * | 10/2008 | Kirkpatrick et al. .......... 717/131 |
| 7,448,079 B2 | 11/2008 | Tremain |
| 7,484,219 B2 | 1/2009 | Mitra |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Lagaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,698,160 B2 | 4/2010 | Beaven et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,849,401 B2 | 12/2010 | Elsa et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0023440 A1 | 9/2001 | Franklin et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0128001 A1 | 7/2004 | Levin et al. |
| 2004/0139202 A1 | 7/2004 | Kumar et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |

(56) References Cited

U.S. PATENT DOCUMENTS

| | | | |
|---|---|---|---|
| 2004/0199543 A1 | 10/2004 | Braud et al. | |
| 2004/0220952 A1 | 11/2004 | Cheenath | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0034029 A1* | 2/2005 | Ramberg et al. | 714/43 |
| 2005/0050555 A1 | 3/2005 | Exley et al. | |
| 2005/0091098 A1 | 4/2005 | Brodersen et al. | |
| 2005/0283478 A1 | 12/2005 | Choi et al. | |
| 2006/0095960 A1 | 5/2006 | Arregoces et al. | |
| 2006/0100912 A1 | 5/2006 | Kumar et al. | |
| 2006/0136382 A1 | 6/2006 | Dettinger et al. | |
| 2006/0168569 A1* | 7/2006 | Smith et al. | 717/124 |
| 2007/0006041 A1* | 1/2007 | Brunswig et al. | 714/38 |
| 2007/0078705 A1 | 4/2007 | Abels et al. | |
| 2007/0088741 A1 | 4/2007 | Brooks et al. | |
| 2007/0124276 A1 | 5/2007 | Weissman et al. | |
| 2007/0130130 A1 | 6/2007 | Chan et al. | |
| 2007/0130137 A1 | 6/2007 | Oliver et al. | |
| 2007/0150546 A1 | 6/2007 | Karakashian et al. | |
| 2007/0226640 A1 | 9/2007 | Holbrook et al. | |
| 2008/0010243 A1 | 1/2008 | Weissman et al. | |
| 2008/0082540 A1 | 4/2008 | Weissman et al. | |
| 2008/0082572 A1 | 4/2008 | Ballard et al. | |
| 2008/0082986 A1 | 4/2008 | Cheenath et al. | |
| 2008/0086358 A1 | 4/2008 | Doshi et al. | |
| 2008/0086447 A1 | 4/2008 | Weissman et al. | |
| 2008/0086479 A1 | 4/2008 | Fry et al. | |
| 2008/0086482 A1 | 4/2008 | Weissman et al. | |
| 2008/0086514 A1 | 4/2008 | Weissman et al. | |
| 2008/0086567 A1 | 4/2008 | Langen et al. | |
| 2008/0086735 A1 | 4/2008 | Cheenath et al. | |
| 2008/0120301 A1* | 5/2008 | Pomerantz | 707/9 |
| 2008/0162544 A1 | 7/2008 | Weissman et al. | |
| 2008/0201701 A1 | 8/2008 | Hofhansel et al. | |
| 2008/0215560 A1 | 9/2008 | Bell et al. | |
| 2008/0270354 A1 | 10/2008 | Weissman et al. | |
| 2008/0270987 A1 | 10/2008 | Weissman et al. | |
| 2009/0030906 A1 | 1/2009 | Doshi et al. | |
| 2009/0049065 A1 | 2/2009 | Weissman et al. | |
| 2009/0049101 A1 | 2/2009 | Weissman et al. | |
| 2009/0049102 A1 | 2/2009 | Weissman et al. | |
| 2009/0049288 A1 | 2/2009 | Weissman et al. | |
| 2009/0180391 A1* | 7/2009 | Petersen et al. | 370/252 |
| 2009/0276395 A1 | 11/2009 | Weissman et al. | |
| 2009/0276405 A1 | 11/2009 | Weissman et al. | |
| 2009/0282045 A1 | 11/2009 | Hsieh et al. | |
| 2009/0319529 A1 | 12/2009 | Bartlett et al. | |
| 2010/0030626 A1* | 2/2010 | Hughes et al. | 705/11 |
| 2010/0077382 A1* | 3/2010 | Sasaki | 717/124 |
| 2010/0153785 A1* | 6/2010 | Keromytis et al. | 714/38 |
| 2010/0191719 A1 | 7/2010 | Weissman et al. | |
| 2010/0205216 A1 | 8/2010 | Durdik | |
| 2010/0211619 A1 | 8/2010 | Weissman et al. | |
| 2010/0223284 A1 | 9/2010 | Brooks et al. | |
| 2010/0235837 A1 | 9/2010 | Weissman et al. | |
| 2010/0274779 A1 | 10/2010 | Weissman et al. | |

OTHER PUBLICATIONS

[online]; [published on Oct. 16, 2008]; [retrieved on Feb. 26, 2010]; retrieved from http://en.wikipedia.org/wiki/Customer_Relationship_Management.

[online]; [published on Apr. 22, 2008]; [retrieved on Feb. 26, 2010]; retrieved from http://en.wikipedia.org/wiki/Flat_file_database.

[online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Varadharajan, Arunkumaran, U.S. Appl. No. 12/909,820, filed Oct. 21, 2010.

First named inventor: Pin, Oliver, U.S. Appl. No. 12/895,833, filed Sep. 30, 2010.

First named inventor: Press, William A., U.S. Appl. No. 12/850,502, filed Aug. 4, 2010.

First named inventor: Tanaka, Jay, U.S. Appl. No. 12/831,209, filed Jul. 6, 2010.

First named inventor: Tanaka, Jay, U.S. Appl. No. 12/831,196, filed Jul. 6, 2010.

\* cited by examiner

TECHNIQUES FOR DISTRIBUTING INFORMATION IN A COMPUTER NETWORK RELATED TO A SOFTWARE ANOMALY

CROSS-REFERENCE TO RELATED APPLICATIONS

The present application claims priority to U.S. provisional patent application No. 61/363,176, filed Jul. 9, 2010, entitled METHODS AND SYSTEMS FOR INVESTIGATING ESCALATIONS AND EXCEPTION IN AN AGILE SYSTEM and identifying Alexis Williams, Analia Mastrogiovanni and James Hatton as inventors.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to software development and more particularly to software development in a multi-user database computer environment.

Development of software may be done in accordance with one or more of different types of development methodologies. Specifically, a development methodology refers to the framework form, planning and controlling the process of developing software. An example of software development methodology is referred to as agile software development. Agile software development refers to a group of software development methodologies based on iterative development and focuses on collaboration between various groups of developers. Some of the goals of the agile software development is customer satisfaction by rapid, continuous delivery of useful software, working software is delivered frequently; measuring progress based upon working software; accepting software requirement changes after development has commenced; close and timely cooperation between software users and software developers; co-location of the parties involved in the development process to promote interpersonal contact; and regular adaptation to changing circumstance, just to name a few.

Computer networks provide a convenient means by which to implement agile software development. However, conventional agile software development techniques are believed to be inefficient for managing software changes after the software has been released to an end user.

What is needed, therefore, are software development techniques that facilitates efficient implementation of software changes.

BRIEF SUMMARY

The present invention features methods and systems of distributing information in a computer network related to a report a software anomaly that includes receiving information concerning the reported software anomaly (RSA); identifying a problematic functional characteristic included in the RSA; ascertaining from a plurality of computer-readable addresses a sub-group of the computer-readable addresses that correspond to parties with information corresponding to the problematic functional characteristic; storing on the computer network an investigation record having associated therewith data corresponding to the RSA; and transmitting to the sub-group a message perceivable by the parties indicating a location on the computer network of the investigation record.

BRIEF DESCRIPTION OF THE DRAWINGS

FIG. 4 is a detailed plan view of a functional area drop down menu employed in the problem investigation interface shown in FIG. 3;

FIG. 6 is a detailed plan view of a severity drop down menu employed in the problem investigation interface shown in FIG. 3;

FIG. 8 is a plan view of a bug interface window interface in accordance with the present invention.

DETAILED DESCRIPTION

Figure 1:
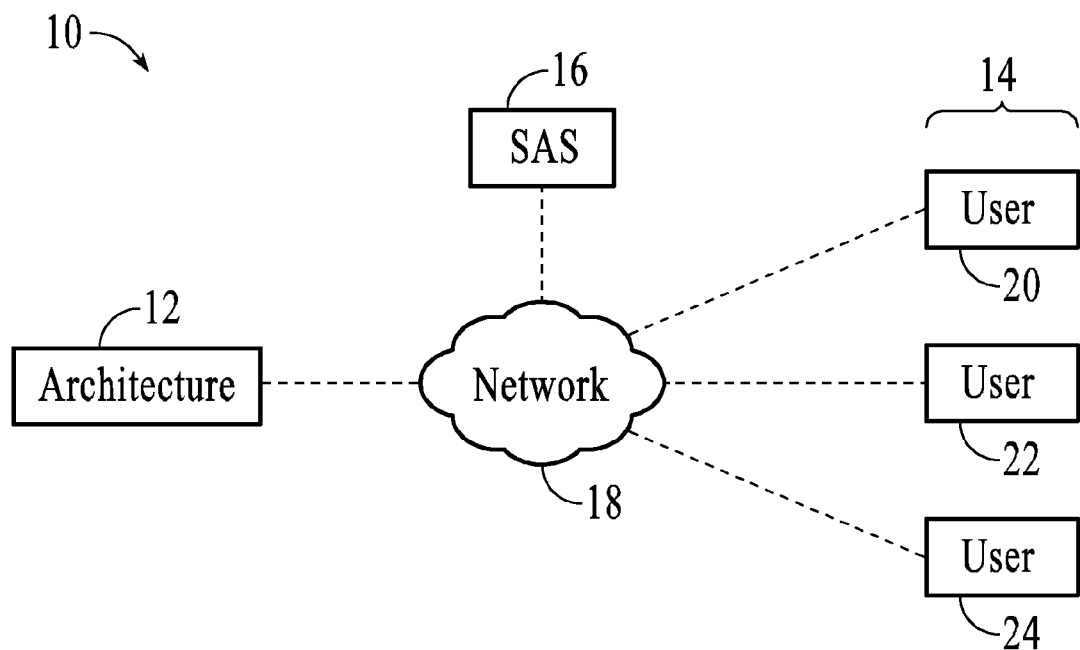
FIG. 1 is a simplified plan view of a computer network in which the current invention is practiced.

Referring to FIG. 1, a computer network 10 includes a multi-tenant database architecture 12 in data communication with client side facilities 14 and a software analysis system (SAS) 16. Components of computer network 10 may be in data communication over any type of known data communication network 18 or combination of networks of devices that communicate with one another. Data communication network 18 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" and will be used in many of the examples herein. However, it should be understood that the networks that the present invention might use are not so limited, although TCP/IP is a frequently implemented protocol. As a result the components of network 10 may be co-located in a common geographic area and/or building or spread across a diverse area of the globe, e.g., on several different continents. Typically, client side facilities 14 and STS 16 are in data communication with architecture 12 over the Internet using suitable computer systems. Architecture 12 includes a multi-tenant database system (MTS) in which various elements of hardware and software are shared by one or more multiple users 20, 22 and 24 associated with client side facilities 14.

Figure 2:
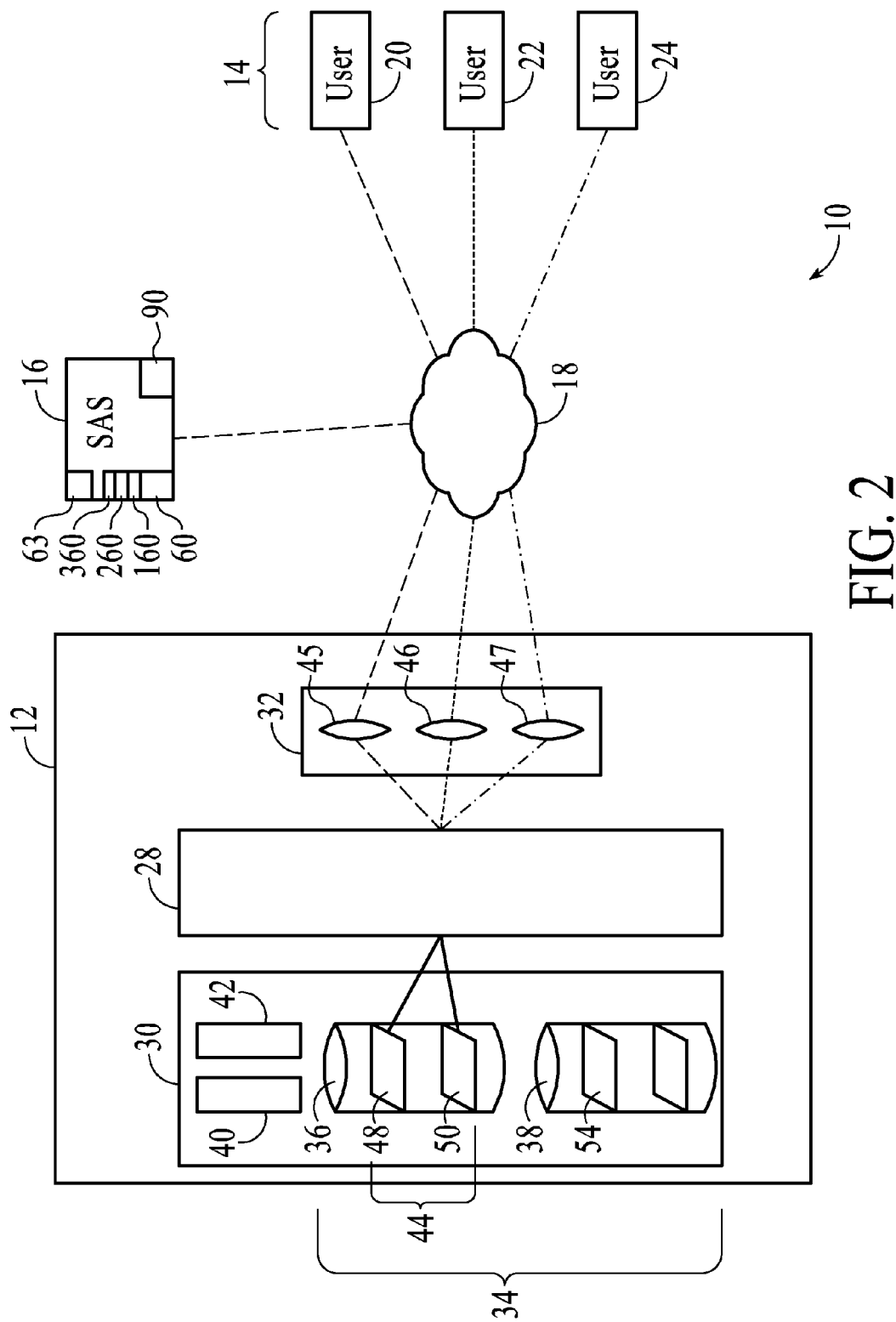
FIG. 2 is a plan view showing a representative architecture in which a multi-tenant database system, shown in FIG. 1, is employed.

A given application server of MTS may simultaneously process requests for a great number of users, and a given database table may store rows for a potentially much greater number of users. To that end, and as shown in FIG. 2, architecture 12 includes a processor sub-system 28, memory space 30, in data communication therewith, and network interface resources 32 in data communication with both memory space 30 and processor sub-system 28. Processor sub-system 28 may be any known processor sub-system in the art, e.g., the CORE DUO® or the CORE 2 DUO® from Intel Corporation of Santa Clara Calif. Memory space 30 includes drive storage 34, shown as one or more hard drives 36 and 38, as well as data and instruction registers, shown as 40, and volatile and non-volatile memory shown as 42.

Architecture 12 provides access to a database 44 by multiple users 20, 22 and 24 of client side facilities 14 over data communication network 18 using standard computer systems (not shown). To that end, network interface resources 32 include a plurality of virtual portals 45-47. Each virtual portal 45-47 provides an "instance" of a portal user interface coupled to allow access to database 44. Typically, tenants obtain rights to store information, referred to as tenant information 48 and 50, on database 44 and make the same accessible to one or more users 20, 22 and 24 to whom the tenant provides authorization. This is typically achieved by rental agreements between the tenant and an owner/provider of architecture 12. In this manner, architecture 12 provides an on-demand database service to users 20, 22 and 24 that are not necessarily concerned with building and/or maintaining the database system; rather, these functions are addressed between the tenant and the owner/provider.

With architecture 12 multiple users 20, 22 and 24 may access database 44 through a common network address, in this example a universal resource locator (URL). In response, web-pages and other content may be provided to users 20, 22 and 24 over data communications network 18. The resources of database 44 that users 20, 22 and 24 may access can be different, depending on user's 20, 22 and 24 security or permission level and/or tenant association. As a result, data structures included in tenant information is managed so as to be allocated at the tenant level, while other data structures might be managed at the user level. Because architecture 12 supports multiple tenants including possible competitors, security protocols 52 and other system software 54, stored for example on hard drive 38, maintain applications and applications' use to only those users 20, 22 and 24 with proper access rights. Also, because many tenants may desire access to architecture 12 rather than maintain their own system, redundancy, up-time, and backup are additional functions that may be implemented in architecture 12.

One advantage of computer network 10 is that functional and/or computational improvements to architecture 12 may be provided in an efficient manner. For example, as is known, functional irregularities may be experienced by the tenant, i.e., the functional characteristics may be different than anticipated. This may be attributable to an, error, flaw, mistake, failure, or fault in a computer program or system that produces an incorrect or unexpected result, or causes it to behave in unintended ways. This is commonly referred to as a bug and referred to herein as a software anomaly. Software anomalies may arise from a variety of situations including errors present in software source code and/or software design. Typically software anomalies are a consequence programming and may arise from oversights or mutual misunderstandings made by a software team during specification, design, coding, data entry and documentation. Software anomalies may result from synergistic operations between different functions of a software program that cause unintended interactions. Other software anomalies may arise from multiple threats or two or more processes executing simultaneously, such that the appropriate order of execution of critical sequences of code are not properly synchronized. This is referred to as a race condition.

Many methodologies have been developed to reduce, if not prevent, the occurrence of software anomalies during fabrication. One such method is the Agile Software Development (ADS) methodology. When developing software employing ASD methodology cross-functional teams of developers develop requirements and solutions for the development of software through collaborative processes. The present invention facilitates development of software employing ASD methodology to efficiently overcome software anomalies utilizing architecture.

Figure 3:
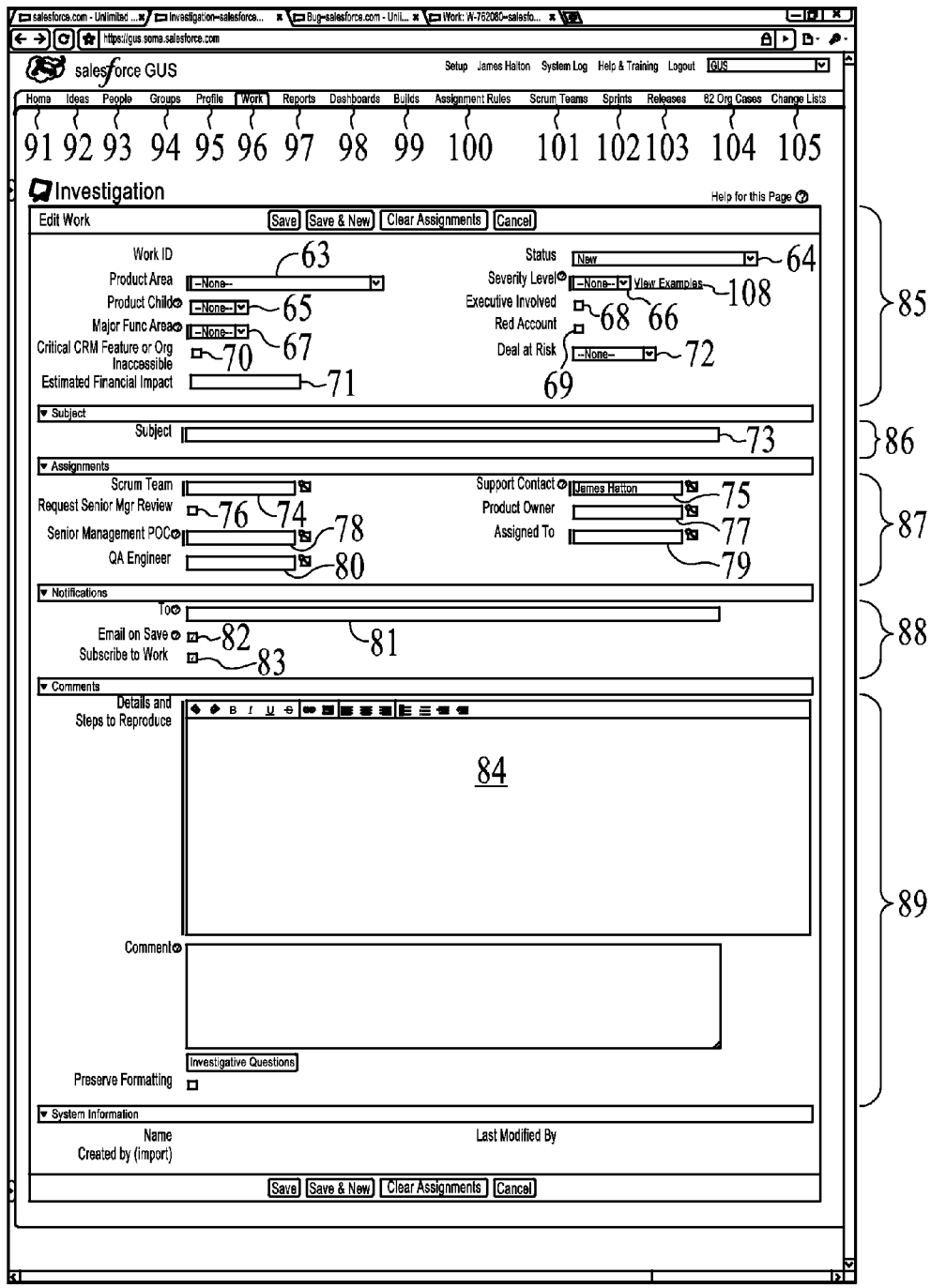
FIG. 3 is a plan view of problem investigation interface in accordance with the present invention.

Referring to FIGS. 2 and 3, in response to a report of a software anomaly from a tenant or one or more of tenant users 20, 22 and 24, referred to as a reported software anomaly (RSA) an investigation file 60 is created in SAS 16 including information concerning the RSA. The RSA may be reported in any known manner to a user of SAS 16, e-mail, regular mail, telephone, in person and the like. Investigation file 60 is typically generated in response to direct communication with the tenant/tenant user 20, 22 and/or 24. In one example, investigation file 60 is generated by launching a graphical user interface, referred to as a problem integration interface (PII) 62 rendered on a display 63. Information is recorded in investigation file 60 that corresponds to information introduced into various data entry fields of (PII) 62. To that end, PII 62 includes a plurality of data entry fields, shown as 63-84, which are arranged in five different regions 85-89 of PII 62. Region 85 is directed to receipt of information concerning classification of the RSA. Section 86 receives information identifying the subject of the RSA. Section 87 receives information concerning assignment of the parties, individuals and/or organizations, which are to investigate the reported RSA. Section 88 receives information regarding parties that will be notified of the process undertaken with respect to investigating the RSA. Section 89 receives detailed information concerning the process.

PII 62 facilitates efficiently identifying investigative resources, e.g., parties and/or assets associated with the owner of architecture 12 employed to investigate the RSA so that the party reporting the software anomaly, e.g., a tenant or tenant user, may have the issue investigated without undue delay and without using unnecessary resources of the investigative entity. To that end, the information received in section 85 allows classifying the nature of the RSA so that the resources allocated to investigating the same is tailored to the impact of the RSA on the relationship between the reporting party and the owner of architecture 12, which in the present example is a business organization, as well as the impact on the owner.

Data entry field (DEF) 63 identifies the product impacted, and DEF 65 indicates whether any additional products are related to the product identified in DEF 63. DEF 54 indicates the age of the RSA and DEF 66 indicates the severity level assigned to the RSA. DEF 67 indicates the functional results of the RSA on the software. For example, software has associated with it a plurality of functional characteristics, e.g., operational behavior that is expected to be demonstrated by a user interacting and/or operating the software. Typically, one or more of the plurality of functional characteristics do no operates as expected that give rise to the RSA. These are referred to as problematic functional characteristics (PFCs). The PFC that is identified as being the most concern is indicated in DEF 67 and defines a controlling PFC of the RSA. A controlling PFC is the operational characteristic of the software that is investigated to determine a cause of the RSA that is related to the PFC. DEF 66 may be seen as a summary of the information associated with DEFs 63-65 and 67-72 such that the information in any one of DEFs 63-65 and 67-72 may cause the severity to rise. For example, DEF 63 may indicate that the product that is the subject of the RSA is very important to the business strategy of the owner of architecture 12 and/or associated with one or more business opportunities of the owner that are very important, e.g., have large accounts with the owner. This may increase the severity level DEF 66. Additionally, it may be that other product lines, such the information concerning the product child indicated in DEF 65 may define the severity level. Additionally, were it determined that the total function of the software was disabled, as indicated by the information in DEF 67, then the severity level may increase. Additional information may be included in section 85 to further clarify the management structure for resolving the RSA, such as whether an Executive of the user is involved with the RSA, e.g., a party having policy making authority for the tenant associated with the user 20, 22 and 24. This information may be indicated in DEF 68, whether it is a critical customer relations management feature of the user 20, 22 And 24, as indicated in DEF 78; or, whether a business deal between the owner of architecture 12 and the tenant associated with user 20, 22 and 24 is at risk as indicated in DEF 72. Also, 71 may provide information concerning the financial impact of the RAS on the owner.

Section 87 is a task assignment section that enables the owner of architecture 12 to assign the task to appropriate parties associated with the owner of architecture 12, based upon the information introduced via section 85 of PII 62. To that end, DEFs 74-80 include assignment categories that are an example of the categories that may be included in the PII 62. It should be understood that other categories may be used, as desired. For example 74 includes information identifying the Scrum Team that will be assigned to the RSA. Scrum teams may include certain parties associated with the owner of network 10. For example, the owner may desire to include members of the Scrum Team that have experience and/or educational background with the product area identified in DEF 63, the major functional areas that are not functioning as identified in DEF 67, e.g., the controlling PFC and/or both. Also DEF 76 may include information indicating that senior management associated with the owner of network 10, e.g., individual or departments that have control or responsibility over the members of the Scrum Team, should be involved in review of the resolution of the RSA. DEF 77 may include information indicating the parties associated with the owner that is in charge of the software product that is the subject of the RSA. DEFs 78-80 indicate other parties associated with the owner of architecture 12 that may be involved in the resolution of the RSA. All identified by PII 62 are being involved in the resolution of an RSA are referred to as a Support Team. Section 88 includes notification information, e.g., addresses to which activities and change to the information content in investigation file 60 are sent. The address information entered into section 88 are recorded in investigation file 60 as computer-readable addresses. To that end, a DEF 81 includes address information, such as an e-mail address, or other computer-readable addresses associated with the members of the Support Team that will be notified concerning the progress made in resolving the RSA. This includes the Scrum Team, as well as the parties identified in DEFs 76, 77 and 78-80. The parties to whom the notifications are sent are not necessarily involved with the solution to the RSA, i.e., not part of the Support Team. However, parties so notified may subscribe to the work so that they may be included in the Support Team activities by entering the appropriate data in DEF 83. Section 89 includes a DEF 84 in which more detailed and comprehensive information concerning the progress of the RSA or other related matters may be recorded.

Figure 4:
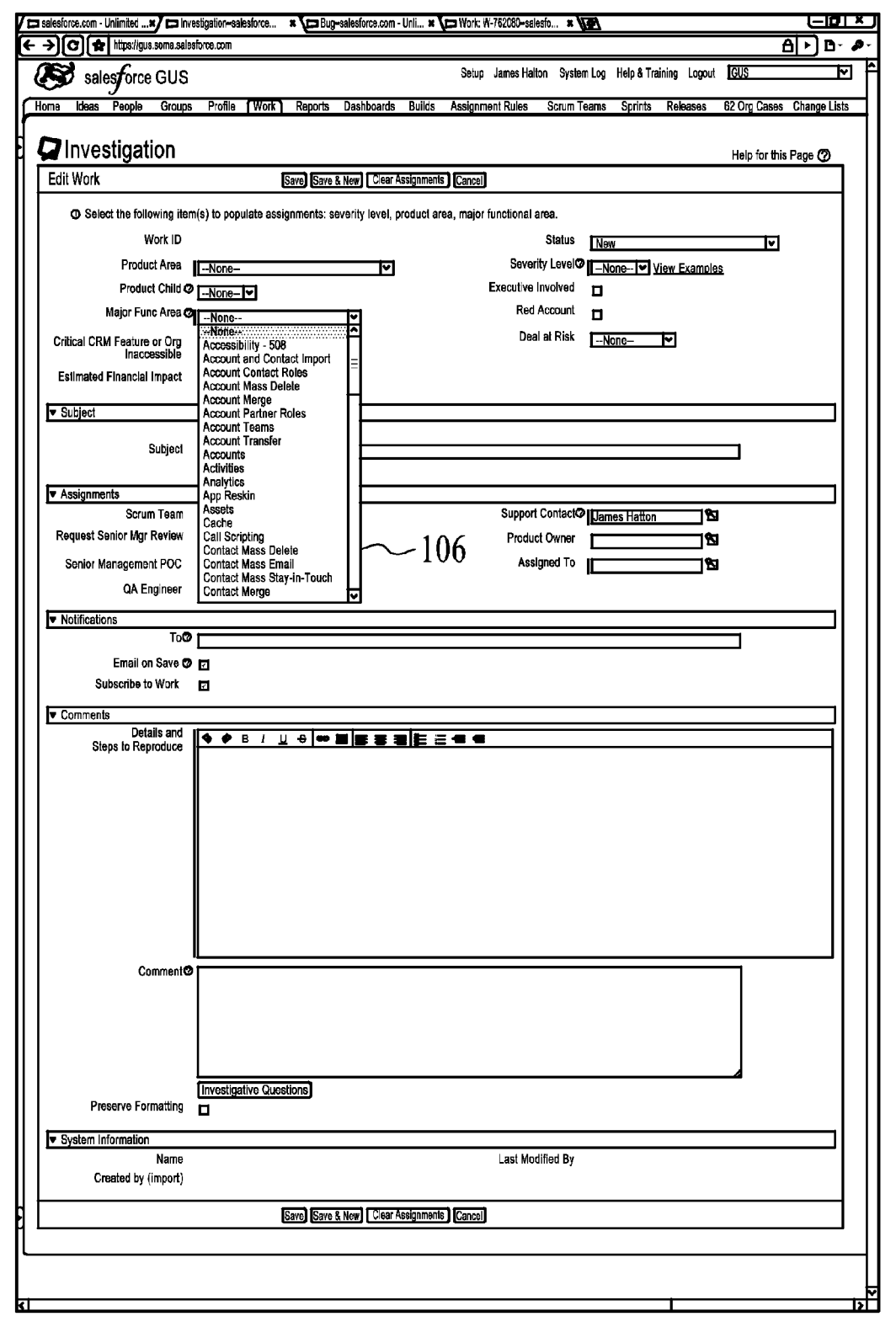

Referring to both FIGS. 1 and 3, it should be understood that the computer-readable code, SAS code 90, which facilitates rendering of PII 62 may be stored anywhere upon network 10. In the present example, however, SAS code 90 is stored in SAS 16 as a plurality of tables that a graphical user system (GUS) program of which PII 62 is a part. As shown, the GUS program provides a plurality of tabs 91-105, each of which corresponds to a different table of data stored in SAS 16. A subset of data tables represented by tabs 91-105 contains information portions of which are rendered on display 63 by PII 62. For example, DEF 67 shows that the data table corresponding to tab 96 includes a list of functional areas included in a drop-down menu 106, shown in FIG. 4. The choices presented by drop-down menu 106 may be dependent upon the RSA or, in the example shown, are independent of the RSA. The e-mail notification function included in section 89, shown in FIG. 3, works synergistically with the data tables represented by tabs 91-105 to fully integrate PII 62 with an existing e-mail server system to provide seamless integration of software functions and allow efficient communication and resource allocation to resolve each RSA.

Figure 5:
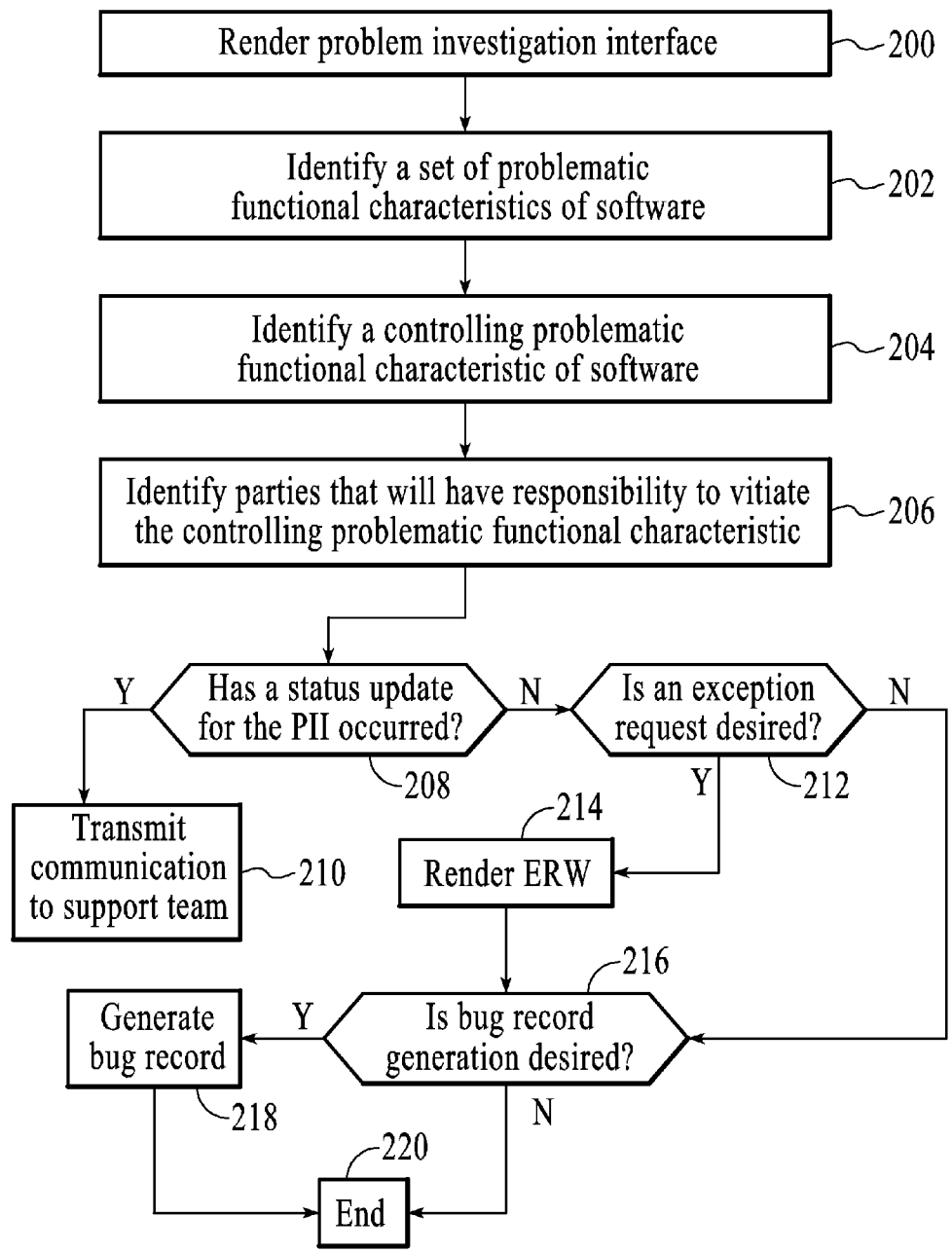
FIG. 5 is a flow diagram showing the functions of the method implemented in accordance with one embodiment of the present invention
Figure 6:
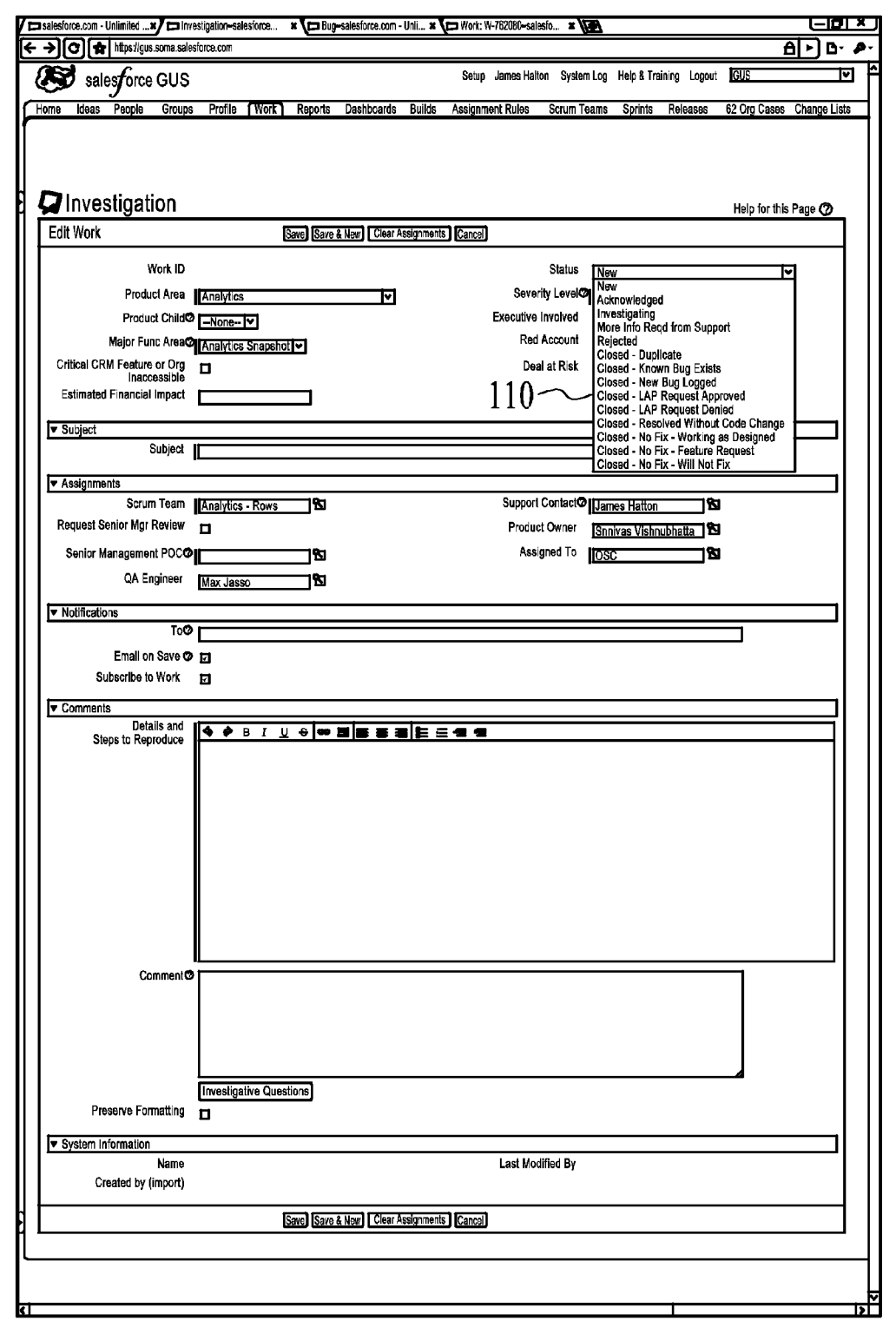

Referring to FIGS. 2, 3 and 5, in operation, PII 62 is rendered on display 63 in response to an RSA at function 200. At function 202, problematic functional characteristics (PFC) of the software that is the subject of the RSA are identified. At function 204 a controlling problematic functional characteristic is identified. The controlling (PFC) may be identified employing any known criteria that may be established by owner of architecture 12 the reporting party and/or both. For example, a controlling PFC may be identified among a plurality of PFCs based upon the frequency of occurrence being greater than frequency of occurrence of the remaining plurality of PFCs identified. Other criteria may concern the interdependence of the plurality of PFCs. When the occurrence of one RFC results from the presence of another PFC, then the latter would be a controlling PFC. Other criteria may be established, as well. For example, information provided directly into DEF 66 and a list of examples of severity levels may be provided by activating link 108 that would launch a window 110, shown in FIG. 6, providing a list of severity levels a description of each severity level in the list and an example of the severity level. At function 206, shown in FIG. 5, parties who will have the responsibility to vitiate the PFC are identified. Typically, the parties are identified are based upon information and/or experience with the PFC. This is typically determined based upon a party's association with the development of the software or sub-component thereof, which is the subject of the PFC. The parties are associated with a team, the identity of which is entered in DEF 74, shown in FIG. 3. Parties who are members of a Scrum Team are assigned tasks with respect to an RSA, and are identified in the appropriate DEF. As a result, by identifying the Scrum Team in DEF 63, a sub-group of a plurality of computer-readable addresses for all the parties that may included in SAS 16 are identified that correspond to parties that are members of the scrum team. Support point of contact (POC) is identified in DEF 75, the product owner in DEF 77; DEF 79 is the person assigned to investigate the issues, usually a software engineer; and the quality assurance engineer in DEF 80. If desired check box 76 is marked appropriately to provide for a senior management point of contact, whose name is identified in DEF 78.

Referring again to FIGS. 2, 3 and 4, at function 208 it is determined whether there has been any status update for the PII 62. If so, function 210 occurs at which point a communication is transmitted to the members of the Support Team. Otherwise, function 212 occurs. An advantage of the current SAS 16 is that is facilitates efficiently tracking and notification of the ongoing assessment and rectification of the software that is the subject of the RSA. To that end, upon generation of investigation file 60 each of the members of the Scrum Team is sent an e-mail, as are the Support Contact, Product Owner and Senior Management point of contact, if applicable. Each member of the aforementioned parties may vary the status in DEF 64 by selecting one of a plurality of status indicators that is recited in a pull-down menu 110, shown in FIG. 6. In addition, to a change in the Status, annotations or other information concerning the RSA may be included in DEF 84. Specifically, each time the information in Status DEF 64 changes, a communication is transmitted to each of the computer-readable addresses associated with each member of the Scrum Team, as well as the Support Contact, Product Owner and Senior Management point of contact. In this fashion, communication to all parties responsible for the RSA is achieved while maintaining a centralized repository of information concerning the same.

Figure 7:
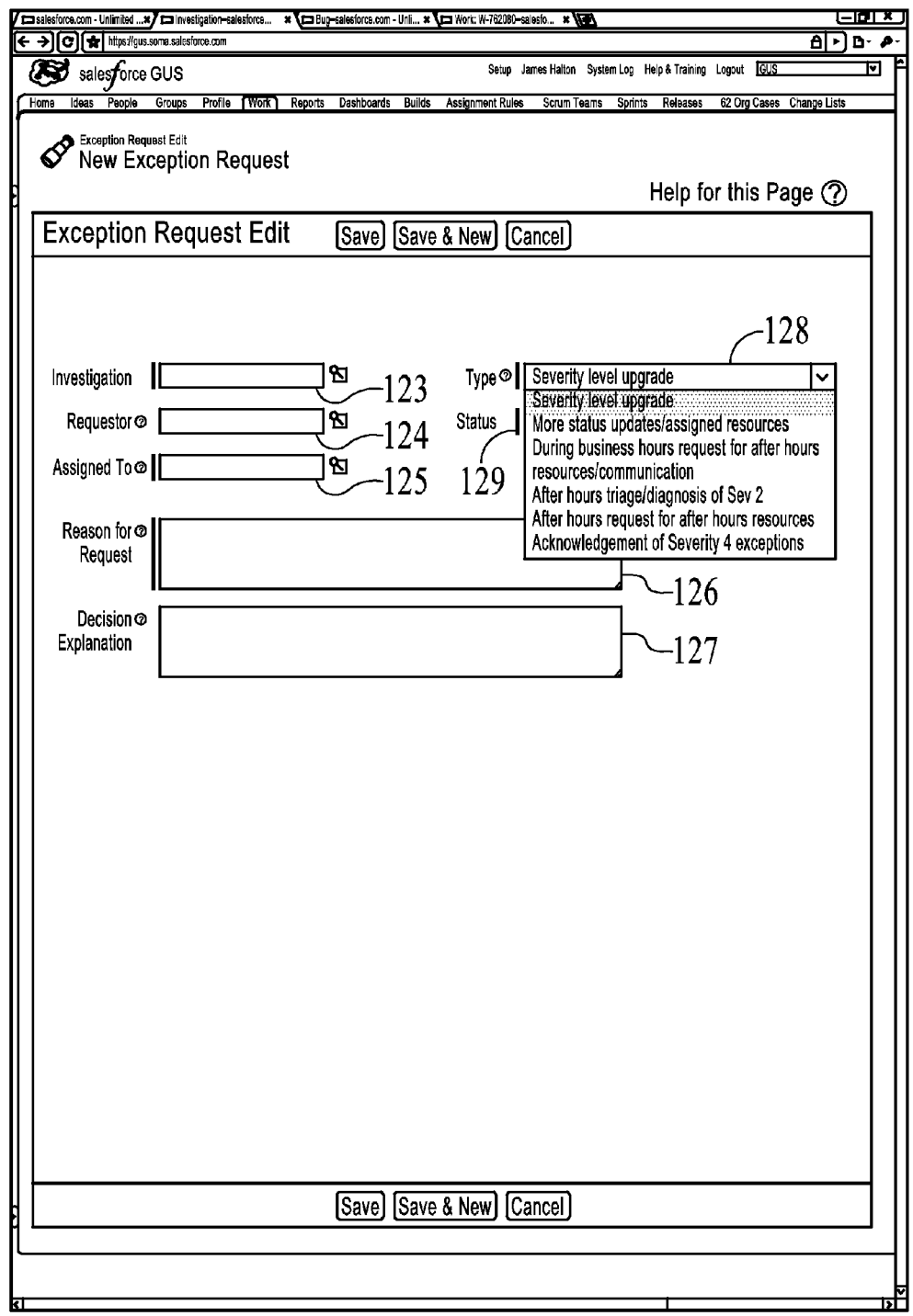
FIG. 7 is a plan view of an exception request window interface in accordance with the present invention.

At function 212 it is determined whether an exception request is desired. If so an exception request window (ERW) 122, shown in FIG. 7 is rendered at function 214, shown in FIG. 5. Otherwise, function 216 occurs. Referring to FIGS. 3 and 7, an exception request is a request by the one or more of the parties that either enter information in PII 62 or are a member of the support team. ERW 122 is launched by selecting tab 105 and selecting exceptions request from a list that is present on the page (not show)) displayed once tab 105 is selected. ERW 122 includes seven DEFs 123-129. Investigation DEF 123 would have entered therein the identity of the exception request. Requestor DEF 124 would have entered therein the identity of the support team member that requested the exception. Assignment DEF 125 identifies a party who would be responsible for overseeing activities undertaken to investigate the exception request. DEF 126 would include information concerning why the member identified in requestor DEF 124 made the exception request. DEF 127 includes information that may be entered at a latter date in response to the request. For example, a party that is a member of the support team may have authority to veto or authorize the request. In addition, other members of the support team may include information concerning their opinions and/or facts concerning the request. DEF 128 is a drop-down menu that provides pre-selected categories for the request. The categories set forth therein are not exhaustive, but merely illustrative and include severity level upgrade, more status updates/assigned resource, during business hours request for after hours resource/communication, after hours triage/diagnosis of Sev 2, which means severity level 2; After hours request for after hours resources, i.e., this is typically for use of resources of network 10 during non-peak hours. For example, this may indicate that employees work outside of normal business hours to investigate the RSA, e.g., weekends, holidays and the like; acknowledgement of Severity 4 exceptions which is a request that the SCRUM team acknowledge that they have seen the RSA and has yet to respond to the query and the like. This information is recorded in investigation file 60, thereby augmenting the same.

Figure 8:
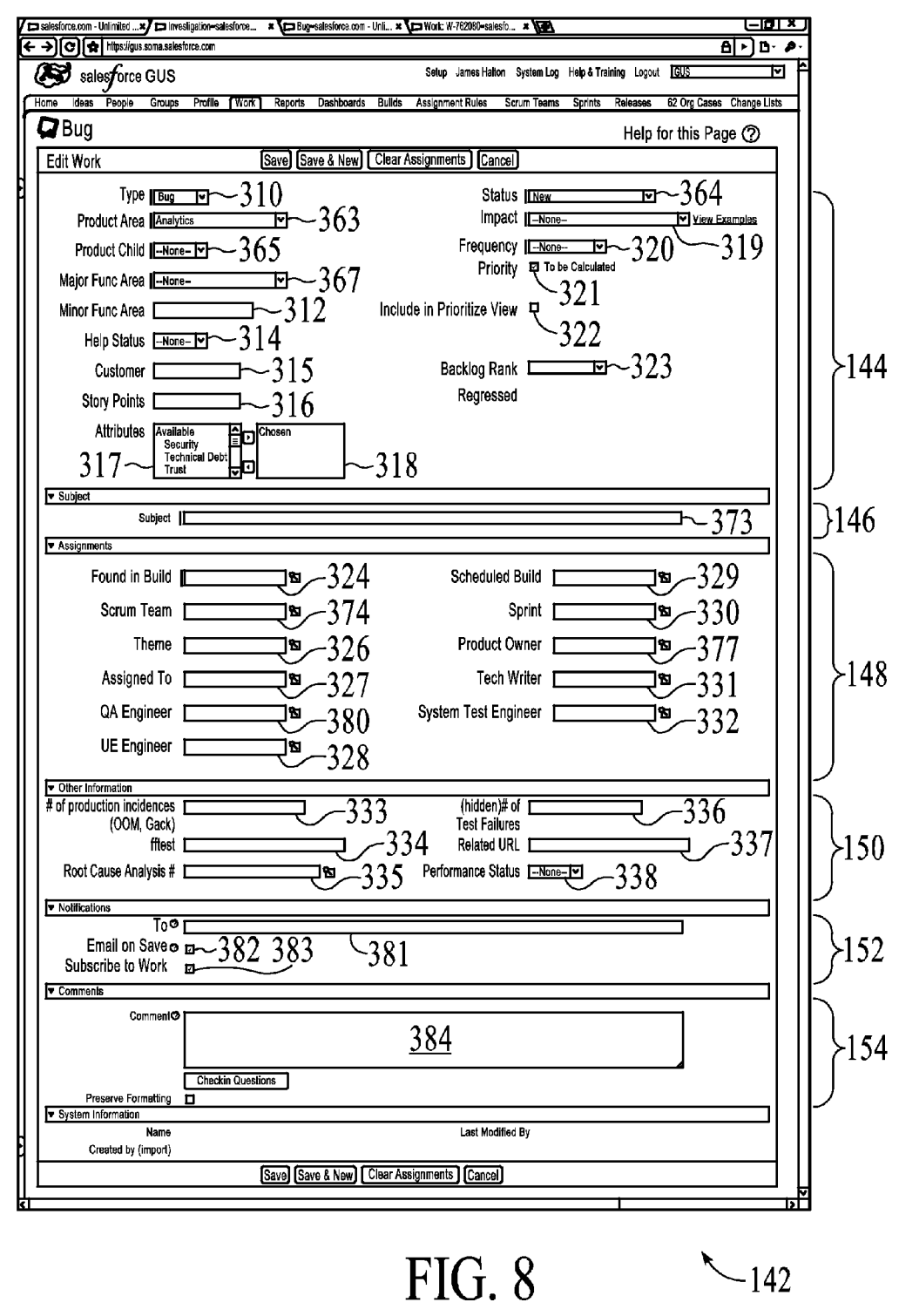

Referring to FIGS. 2, 5 and 8, at function 216 it is determined whether it is desired to generate a bug record. If so, a bug record 140 is generated at function 218 by user of a bug interface window (BIW) 142 rendered on display 63. Otherwise the process ends at function 220. BIW 142 is launched by selecting tab 105 and selecting exceptions request from a list that is present on the page (not shown) displayed once tab 105 is selected. BIW 142 includes six regions 144, 146, 148, 150, 152 and 154. Each of regions includes one or more data entry field (DEF). DEFs 363, 365, 367, 373, 374, 380, 377, 381 382, 383 and 384 are the same as DEFs 63, 65, 67, 73, 74, 80, 77, 81 82, 83 and 84, discussed above with respect to PII 62. Other DEFs included in BIW are 310, 312, 314, 316 and 317-332. DEF 317 is a pull down menu providing a list of attributes that may be selected to clarify the RSA, e.g., the RSA may involve operational characteristics related to security, technical features, trust, flapper performance, regressed, requires testing, system impact and the like. DEF 318 identifies the attribute selected in DEF 17, which may be set manually may be selected in response to a user's profile, e.g., a particular user may always result in DEF 318 having attribute "Requires Testing" identified. DEF 319 defines the specific functionality of the software that the bug causes, e.g., the operational characteristics performance on a particularly webpage is very slow, and then the impact selected may be identified as "Performance". DEF 320 identifies the frequency of the impact, e.g., always, often, sometimes, rarely. This represents qualitative, as opposed to quantitative information. DEF 321 is the priority assigned to the bus and is generated is response to the impact and frequency the bug and does not require user input to establish. Selections include P0, P1, P2, P3, P4, from most critical to least critical. Priority may be established by user input on as to override the priority established in response to the impact and frequency of the bug. DEF 322 is a check box that includes information concerning the but in a Prioritizer page (not shown), which is a webpage used by an owner of the product area identified in DEF 377 to prioritize the work An owner is an individual of the owner of architecture 12 who is responsible for the product area. DEF 323 defines the Backlog Rank and is a numeric field used to prioritize work by the owner of the product area identified DEF 63, shown in FIG. 3. Referring again to FIG. 8 DEF 325 identities the current build, e.g., revision number, of the product where the bug was identified. DEF 326 identifies the theme associated with the bug. Themes are a categorization scheme to organize bugs and user stories related to the bug. For example, a user story that deals with performance would be under the "GUS Improvements" theme. DEF 327 identifies the individual, typically working for the owner of architecture 12 shown in FIG. 1, who will work on removing the bug, DEF 328, –DEF 332 and DEF 332 identify other individuals, who typically work for the owner of architecture 12 that will assist with removing the bug. For example DEF 328 identifies a user experience engineer, DEFE 331 identifies a technical writer and DEF 332 identifies a system test engineer. DEF 329 identified the build, e.g., revision, of the product in which the solution that removes the bug will be implemented. DEF 330 is a sprint field. In this manner, BIW 142 is employed to augment the investigation record with data including a cause of the controlling functional characteristic and generating, in response thereto, a bug record. It should be understood that the parties assigned to the team to investigate the information in BIW 142 may be different or the same as the team members assigned to the RSA.

It should be understood that the foregoing discussion has been with respect to one investigation file 60, shown in FIG. 2, for the sake of simplicity of discussion. However, in practice hundreds to thousands of investigation files may be present in SAS 16, shown as 160, 260 and 360. Each investigation file 60, 160, 260, and 360 may be categorized as containing all information for a single reported RSA, such that the RSA associated with on of investigation files 60, 160, 260, and 360 is different from the ISA associated with the remaining investigation files 60, 160, 260, and 360. However, further processing may be undertaken by a user so that multiple investigation files 60, 160, 260, and 360 may be incorporated into a single investigation file 60, 160, 260 or 360 when efficiency handling and/or resolving an RSA. For example, it may be that multiple investigation files 60, 160, 260, and 360 concern a common product and, as such, all investigation files related to the common product that were the subject of multiple investigation files 60, 160, 260, and 360 may be combined into a common investigation file, e.g., 60, 160, 260 or 360. Alternatively, or in addition thereto, it may be that multiple RSAs have a common bug associated therewith, e.g. for example a newly introduced algorithm across multiple products may be identified in multiple investigation files 60, 160, 260, and 360 as having a bug associated therewith. It may be beneficial to accumulate all the information from the multiple investigation files into a common investigation file to facilitate an expeditious resolution of the matter. Moreover, it may be that individuals and/or Support Teams may be assigned to more than one RSA. Organized handling of multiple RSAs by a common Support Team and/or common individuals may be undertaken by assigning investigation files 60, 160, 260, and 360 with a priority level, such that the investigation file 60, 160, 260, and 360 with the highest priority level is acted on before investigation files with lower priority levels.

The Computer code for operating and configuring network 10 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method of distributing information in a computer network related to a reported software anomaly, said method comprising:
    receiving information concerning said reported software anomaly (RSA);
    identifying a controlling problematic functional characteristic included in said RSA, the controlling problematic functional characteristic being identified among a plurality of functional characteristics, each functional characteristic of the plurality of functional characteristics comprising an operational behavior that is expected to be demonstrated by operating the software, wherein the controlling problematic functional characteristic comprises an operational characteristic of the software to be investigated to determine a cause of the RSA;
    ascertaining from a plurality of computer-readable addresses a sub-group of said computer-readable addresses that correspond to parties with information corresponding to said controlling problematic functional characteristic that are assigned to investigate the RSA;
    storing on said computer network an investigation record having associated therewith data corresponding to said RSA;
    transmitting to said sub-group a message perceivable by said parties when information changes in a status field of the investigation record stored on said computer network;
    augmenting said investigation record with data including the cause of said controlling problematic functional characteristic;
    generating, in response to augmenting said investigation record, a bug record;
    identifying additional computer-readable addresses corresponding to additional parties having information related to the cause for removing the RSA; and
    transmitting, to the additional computer-readable addresses, a second message perceivable by said additional parties indicating a location on said computer network of said bug record.

2. The method as recited in claim 1 wherein storing further includes storing said investigation record in a database having a plurality of additional investigation records stored therein, defining a plurality of investigation records, each of which is assigned a priority level that indicates a relative rank among said plurality of investigation records.

3. The method as recited in claim 1 wherein computer-readable addresses of the sub-group are different than the computer-readable addresses associated with the remaining functional characteristics of said plurality of functional characteristics.

4. The method as recited in claim 1 further including transmitting additional messages to members of said group in response to predetermined events with respect to said investigation record.

5. The method as recited in claim 1 further including associating said bug record with said investigation record.

6. A computer product of the type comprising a non-transitory computer readable medium that contains a program to control a computer having a display, said computer product comprising:
    computer code that receives information concerning a reported software anomaly (RSA);
    computer code that identifies a controlling problematic functional characteristic included in said RSA, the controlling problematic functional characteristic being identified among a plurality of functional characteristics, each functional characteristic of the plurality of functional characteristics comprising an operational behavior that is expected to be demonstrated by operating the software, wherein the controlling problematic functional characteristic comprises an operational characteristic of the software to be investigated to determine a cause of the RSA;
    computer code that ascertains from a plurality of computer-readable addresses a sub-group of said computer-readable addresses that correspond to parties with information corresponding to said controlling problematic functional characteristic that are assigned to investigate the RSA;

computer code that stores on said computer network an investigation record having associated therewith data corresponding to said RSA;

computer code that transmits to said sub-group a message perceivable by said parties when information changes in a status field of the investigation record stored on said computer network computer code that augments said investigation record with data including the cause of said controlling problematic functional characteristic;

computer code that generates, in response to augmenting said investigation record, a bug record;

computer code that identifies additional computer-readable addresses corresponding to additional parties having information related to the cause for removing the RSA; and computer code that transmits, to the additional computer-readable addresses, a second message perceivable by said additional parties indicating a location on said computer network of said bug record.

7. The computer product as recited in claim 6 wherein said computer code that stores further includes a sub-routine to store said investigation record in a database having a plurality of additional investigation records stored therein, defining a plurality of investigation records, each of which is assigned a priority level that indicates a relative rank among said plurality of investigation records.

8. The computer product as recited in claim 6 further including computer code that transmits additional messages to members of said group in response to predetermined events with respect to said investigation record.

9. The computer product as recited in claim 6 further including computer code that augments said investigation record with data including a cause of said controlling problematic functional characteristic and generating, in response thereto, a bug record.

10. An apparatus for testing computer-readable code, the apparatus comprising:

a processor; and one or more stored sequences of instructions which, when executed by the processor, cause the processor to carry out the steps of:

receiving information concerning said reported software anomaly (RSA);

identifying a controlling problematic controlling functional characteristic included in said RSA, the controlling problematic functional characteristic being identified among a plurality of functional characteristics, each functional characteristic of the plurality of functional characteristics comprising an operational behavior that is expected to be demonstrated by operating the software, wherein the controlling problematic functional characteristic comprises an operational characteristic of the software to be investigated to determine a cause of the RSA;

ascertaining from a plurality of computer-readable addresses a sub-group of said computer-readable addresses that correspond to parties with information corresponding to said controlling problematic functional characteristic that are assigned to investigate the RSA;

storing on said computer network an investigation record having associated therewith data corresponding to said RSA;

transmitting to said sub-group a message perceivable by said parties when information changes in a status field of the investigation record stored on said computer network;

augmenting said investigation record with data including the cause of said controlling problematic functional characteristic;

generating, in response to augmenting said investigation record, a bug record;

identifying additional computer-readable addresses corresponding to additional parties having information related to the cause for removing the RSA; and transmitting, to the additional computer-readable addresses, a second message perceivable by said additional parties indicating a location on said computer network of said bug record.

11. The apparatus as recited in claim 10 where said sequence of instructions includes additional instruction, when executed by the processor, cause the processor to carry out said step of storing to store said investigation record in a database having a plurality of additional investigation records stored therein, defining a plurality of investigation records, each of which is assigned a priority level that indicates a relative rank among said plurality of investigation records.

12. The apparatus as recited in claim 10 wherein said sequence of instructions includes additional instruction, when executed by the processor, cause the processor to carry out a step of transmitting additional messages to members of said group in response to predetermined events with respect to said investigation record.

13. The apparatus as recited in claim 10 wherein said sequence of instructions includes additional instruction, when executed by the processor, cause the processor to carry out a step of associating said bug record with said investigation record.

14. The method of claim 1, wherein receiving the information concerning said RSA comprises receiving the information introduced into various data entry fields of a problem integration interface rendered on a display.

15. The method of claim 14, wherein one or more fields of the various data entry fields causes an increase to a severity level indicated by a severity level field of the investigation record.

16. The method of claim 1, the computer network including a multi-tenant database architecture, wherein receiving the information concerning said RSA comprises receiving the information in response to a report of the software anomaly from a tenant or one or more tenant users.

17. The method of claim 1, further comprising incorporating the investigation record with one or more additional investigation records when the investigation record and the one or more additional investigation records concern a common product.

18. The method of claim 1, further comprising incorporating the investigation record with one or more additional investigation records when the investigation record and the one or more additional investigation records have a common bug associated therewith.

19. The method of claim 18, wherein the common bug comprises a newly introduced algorithm across multiple products.

20. The method of claim 1, wherein identifying the controlling problematic functional characteristic comprises identifying the controlling problematic functional characteristic from among the plurality of functional characteristics based upon a frequency of occurrence of the controlling problematic functional characteristic being greater than frequencies of occurrence of the remaining functional characteristics of the plurality.

21. The method of claim 1, wherein identifying the controlling problematic functional characteristic comprises identifying the controlling problematic functional characteristic from among the plurality of functional characteristics based upon an interdependence among the plurality of functional characteristics.

22. The method of claim 1, wherein the parties assigned to investigate the RSA are different than the additional parties who will work on removing the RSA.

23. The computer product of claim 6, wherein the parties assigned to investigate the RSA are different than the additional parties who will work on removing the RSA.

24. The apparatus of claim 10, wherein the parties assigned to investigate the RSA are different than the additional parties who will work on removing the RSA.

\* \* \* \* \*